L. BISSELL.
Car Truck.
No. 62,727.
Patented Mar. 12, 1867.
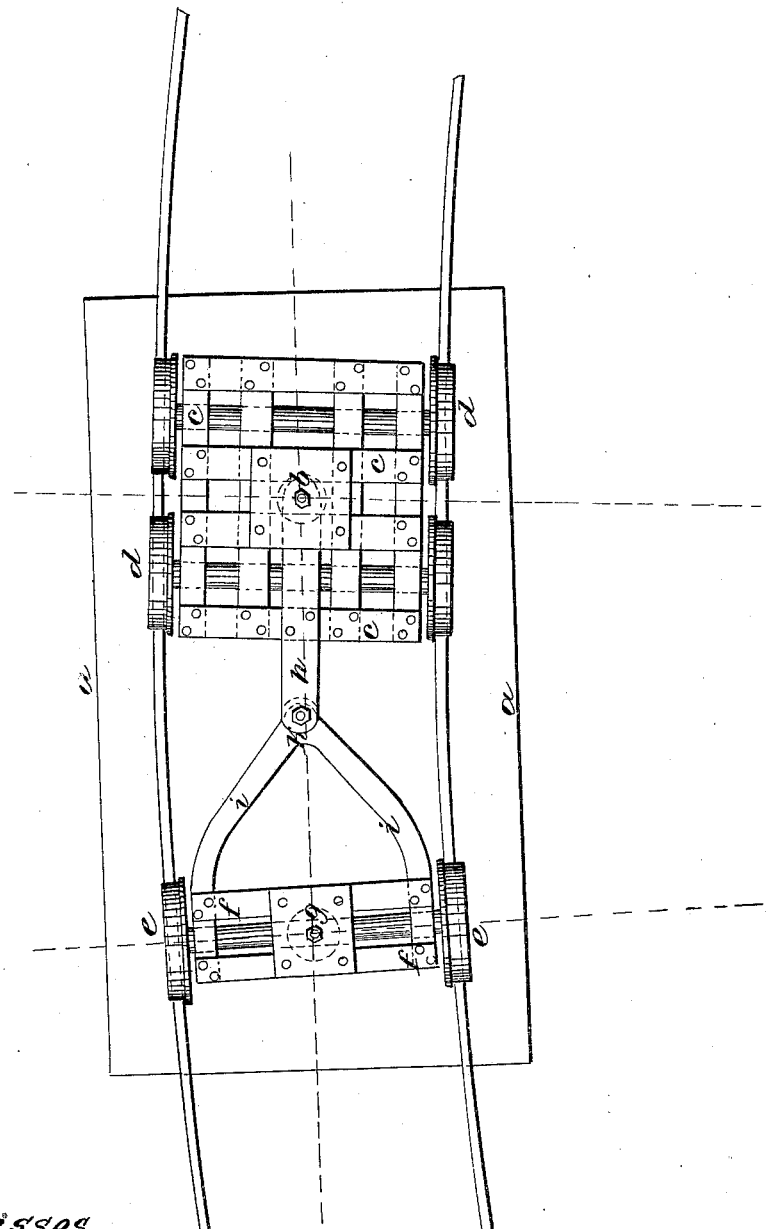
Witnesses
Chas H Smith
Geo. D Walker
Inventor
Levi Bissell

United States Patent Office.

LEVI BISSELL, OF NEW YORK, N. Y.

Letters Patent No. 62,727, dated March 12, 1867.

---

IMPROVED CAR TRUCK.

---

The Schedule referred to in these Letters Patent and making part of the same.

---

TO ALL WHOM IT MAY CONCERN:

Be it known that I, LEVI BISSELL, of the city and State of New York, have invented and made a certain new and useful improvement in Trucks for Cars and Locomotive Tenders; and I do hereby declare the following to be a full, clear, and exact description of the said invention, reference being had to the annexed drawing, making part of this specification, wherein I have shown a plan of the trucks below the platform, so as to represent my improvement.

Trucks for locomotive engines have heretofore been made in which a lateral motion has been allowed beneath the forward end of the engine, and this device has been employed both in connection with two-wheeled and four-wheeled trucks. The tenders for locomotive engines have also been made with a four-wheeled truck, set on a king-bolt, and two wheels supported in fixed pillow blocks.

The nature of my said invention consists in a pair of wheels supported in a frame and moving on a king-bolt, in combination with a four or more wheeled truck, the two being connected by jointed braces so that the frame of the two-wheeled truck is held parallel to that of the four-wheeled truck in running on a straight line, or turned so that the axles stand nearly on the radial line of the curve when the track is not upon a straight line.

In the drawing the general outline of the platform car or locomotive tender is illustrated by the red line $a$; $b$ is the king-bolt, $c$ is the truck frame, and $d$ the wheels of the truck. These parts are to be of any desired construction, character, size, or shape. The pair of wheels $e\,e$ are mounted upon an axle that is set in suitable boxes in the frame $f$, and this frame $f$ is supported and attached by the king-bolt $g$. $h$ is a brace or bar from the truck frame $c$, attached to the same in any desired manner, and $i$ is a brace from the truck frame $f$. These are united together by a joint at $k$. It will now be apparent, as illustrated by the drawing, that in travelling a curved track the axle of the wheels $e$ will be turned at an angle to the axles of the wheels $d$, by the action of the truck and frame $c$ upon the frame $f$, so that the axles will stand nearly upon the radial line of the curved track, and upon a straight track the axles will be parallel. It will be understood that the truck $c$, with four or more flanged wheels, will always accommodate itself to the change of direction in the track, either from a straight line to a curve or the reverse, and that the motion of the truck on its king-bolt is communicated through $h$ and $i$ to the frame $f$ of the wheels $e$, so that said wheels $e$, instead of standing at the same angle to the curved track as the platform itself, and tending to mount the exterior rail of the curved track, stand with their axis on the radial line of the curved track, and travel that track without the tendency before named. The two frames or trucks being tied together, the one prevents the other vibrating by slight inequalities of the track or the swaying of the load; and in running over a curved track the friction is greatest upon the wheel $e$ that travels upon the outer rail, hence the tendency is to turn the truck $c$ so as to relieve the flanges of the wheels $d$ from contact with the rails.

What I claim, and desire to secure by Letters Patent, is—

A two-wheeled truck, in combination with a truck of four or more wheels, both trucks moving on king-bolts and connected together by jointed braces, substantially as set forth.

In witness whereof I have hereunto set my signature this thirty-first day of December, A. D. 1866.

LEVI BISSELL.

Witnesses:
GEO. D. WALKER,
CHAS. H. SMITH